(31.)

DANIEL A. JOHNSON.

Improvement in Thill Couplings.

No. 4,681. Reissued Dec. 26, 1871.

WITNESSES.

A. Moore

D. P. Howe

INVENTOR.

Dan'l A. Johnson by his Attys

A. H. & R. K. Evans

AM. PHOTO-LITHOGRAPHIC CO. N.Y. (OSBORNE'S PROCESS.).

UNITED STATES PATENT OFFICE.

DANIEL A. JOHNSON, OF BOSTON, MASSACHUSETTS.

IMPROVEMENT IN THILL-COUPLINGS.

Specification forming part of Letters Patent No. 113,525, dated April 11, 1871; reissue No. 4,681, dated December 26, 1871.

*To all whom it may concern:*

Be it known that I, DANIEL A. JOHNSON, of Boston, in the county of Suffolk and State of Massachusetts, have invented certain Improvements in Thill-Couplings, of which the following is a full, clear, and exact description, reference being had to the accompanying drawing making part of this specification, in which—

Figure 1:
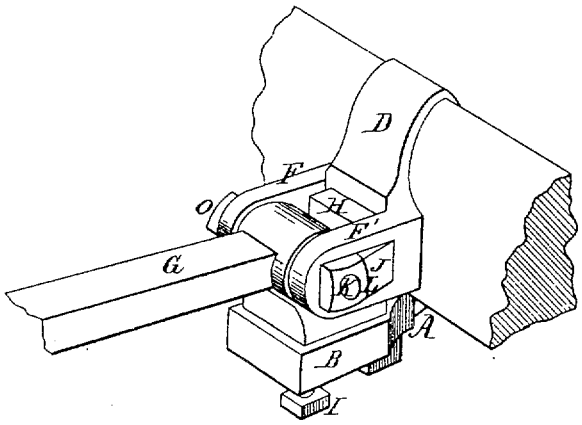
Figure 2:
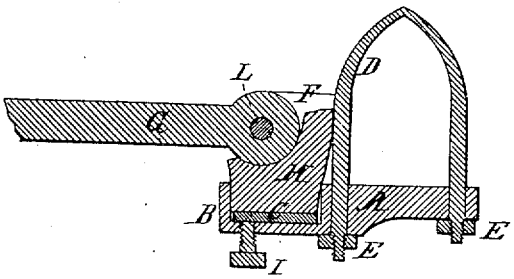

Figure 1 is a perspective view of my improved thill-coupling. Fig. 2 is a longitudinal central vertical section.

This invention relates to that class of thill-couplings in which an elastic packing is employed to prevent rattling and consequent wear of the parts; and consists mainly in certain devices for adjusting and regulating the pressure of said packing; and also in a device for holding the nut of the bolt which couples the thill, all of which will be more fully described hereafter.

In the said drawing, A represents the yoke of the coupling, the forward part of which is provided with a socket, B, in which is located a plate, C. D represents the band which surrounds the axle, the ends of which band pass through the rear portion of the yoke A, and are secured thereto by nuts E. F F′ represent lugs projecting from the band D above the socket B, between which lugs is pivoted the thill G. H represents a packing, of rubber, which rests in the socket B on the plate C, between lugs F F′, and projects upward behind the thill, being provided with a concavity which fits the circular end of said thill. I represents a set-screw which enters the bottom of the socket B, and bears against the plate C. J represents a projection on the outer side of the lug F′, which projection holds the nut K of the coupling-bolt L, and prevents the same from turning. This projection may, however, be on the lug F instead of on the lug F′, in which case it will prevent the head of the bolt from turning.

*Operation.*

The end of the thill G is placed in position between the lugs F F′, and the bolt L is introduced and secured by screwing the nut K partially up, and then drawing the bolt back until said nut comes in contact with the lug F′; the bolt L is then turned by means of a wrench or other power applied to its head O, the nut K being held by projection J until the whole is tightly screwed up, when, as will be readily seen, the nut K cannot be turned. The rubber packing H is then compressed by means of the set-screw I and plate C, until it presses with any desired force against the thill G, thereby preventing any rattling of the latter, and forming a noiseless and secure coupling.

I am aware that rubber packing has been used heretofore in thill-couplings; but I know of no arrangement for compressing said packing after the thill is attached, it being usually necessary to crowd the thill against the packing with great force in order to compress it sufficiently, thus requiring much physical strength to perform the operation of coupling the thills. With my device, however, the operation can be performed by any person with but little exertion, it being only necessary to put the thill in place and compress the rubber by means of the screw I, as above mentioned.

Instead of the yoke A being provided with a socket made in one and the same piece therewith, a portion of the socket may be formed in a piece separate therefrom—for instance, one or more sides of the plate C upon which the packing H bears, and which is operated by the set-screw, may be turned up to form a portion or the whole of the socket, without departing from the spirit of my invention.

The projection J which locks the bolt-nut K is of great utility, and supplies a want long felt in this direction, obviating any difficulty in removing the bolt when the thread becomes rusted, and any danger of losing the nut.

Having thus fully described my invention, what I claim as new, and desire to secure by Letters Patent, as an improvement in thill-couplings, is—

A yoke, A, provided with a socket, whether made in one and the same piece therewith, or partially in a piece separate therefrom, substantially as described.

I also claim a yoke, A, provided with a socket, whether made in one and the same piece therewith, or partially in a piece separate therefrom, in combination with the packing H, band D, lugs F F′, screw I, and plate C, substantially as and for the purpose set forth.

I also claim the lug F or F′, provided with a projection, J, as and for the purpose described.

Witness my hand this 23d day of November A. D. 1871.

In presence of— D. A. JOHNSON.

P. E. TESCHEMACHER,

N. W. STEARNS.

(31)